Patented Oct. 1, 1946

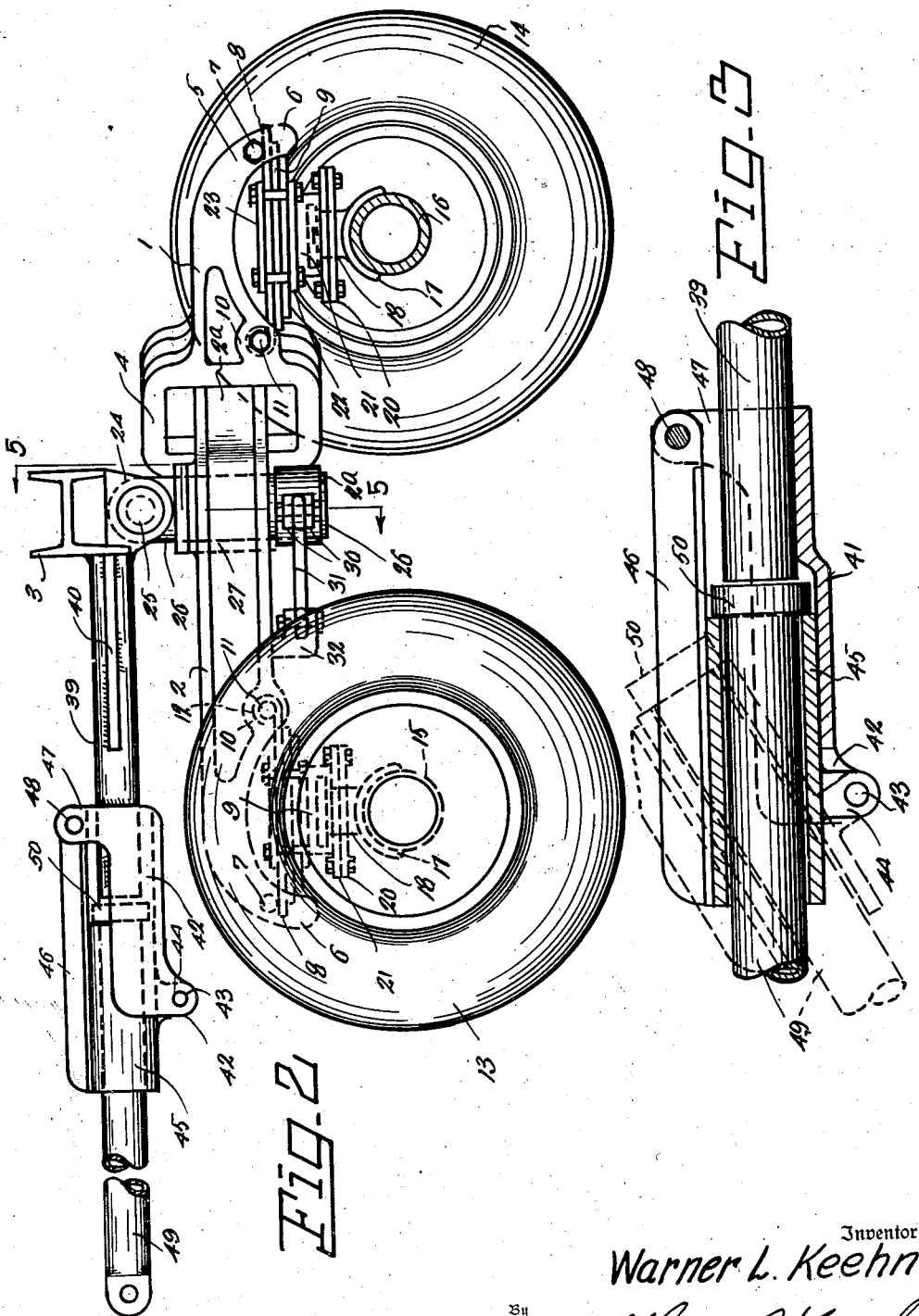

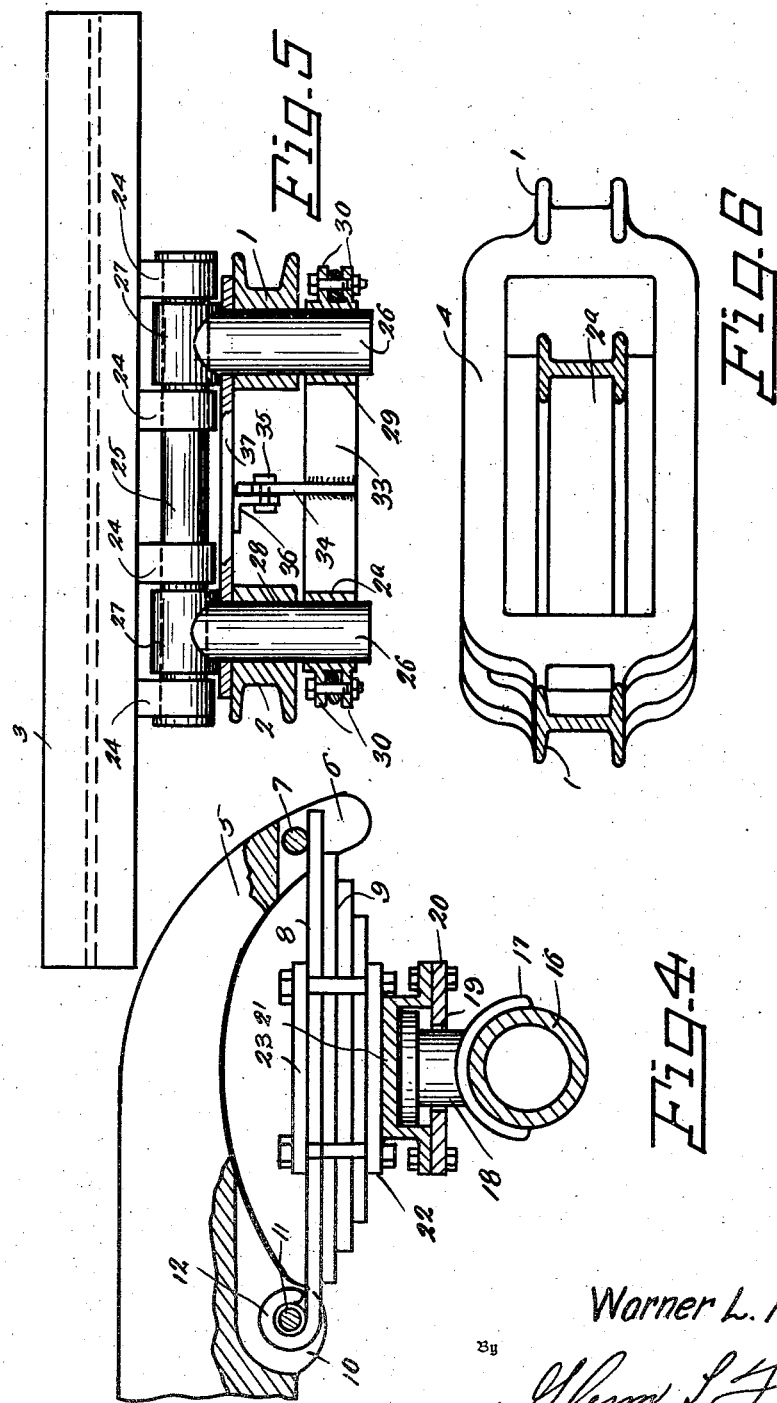

2,408,561

UNITED STATES PATENT OFFICE 2,408,561

DUAL AXLE TRAILER

Warner L. Keehn, Spokane, Wash.

Application December 28, 1944, Serial No. 570,203

5 Claims. (Cl. 280—102)

This invention relates to a trailer and more particularly to a trailer having dual axles, it being one object of the invention to provide a trailer with axles so mounted that when a turn is made the two axles may both turn and thus prevent wear upon the tires of wheels carried by one axle being greatly in excess of wear upon the tires of wheels carried by the other axle. Therefore, the wear upon the tires of all the wheels will be approximately even instead of one set of tires wearing faster than the other.

Another object of the invention is to so mount the axles that as one is turned about its fifth wheel, corresponding turning movement will be transmitted to the other axle and the two axles thus caused to simultaneously turn for steering the trailer and preventing the tires of wheels upon one axle being subjected to transverse rubbing action which has a tendency to quickly wear the treads of the tires.

Another object of the invention is to provide the trailer with walking beams so mounted that front and rear axles of the trailer will be swung in opposite directions when a turn is made, the axles being provided with springs which permit vertical movement of the same when the wheels move along rough roads or across rocks or other obstructions.

Another object of the invention is to provide the trailer with a tongue so connected with a draft bar that after logs have been dumped, the trailer may be shifted forwardly until its front wheels rest upon a truck with which the trailer is connected, the trailer being thus hauled when not loaded with logs.

Another object of the invention is to provide a trailer which is very strong and capable of carrying a heavy load of logs.

In the accompanying drawings:

Fig. 2 is a view showing the trailer partially in side elevation and partially in section, the view being taken on the line 2—2 of Fig. 1.

Fig. 3 is a view taken longitudinally through the tongue and draft bar on the line 3—3 of Fig. 1.

Fig. 4 is a fragmentary sectional view on the line 4—4 of Fig. 1.

Fig. 5 is a view taken transversely through the trailer on the line 5—5 of Fig. 2.

Fig. 6 is a fragmentary view, on the line 6—6 of Fig. 1, showing the crossed portions of the longitudinally extending beams of the trailer.

Figure 1:
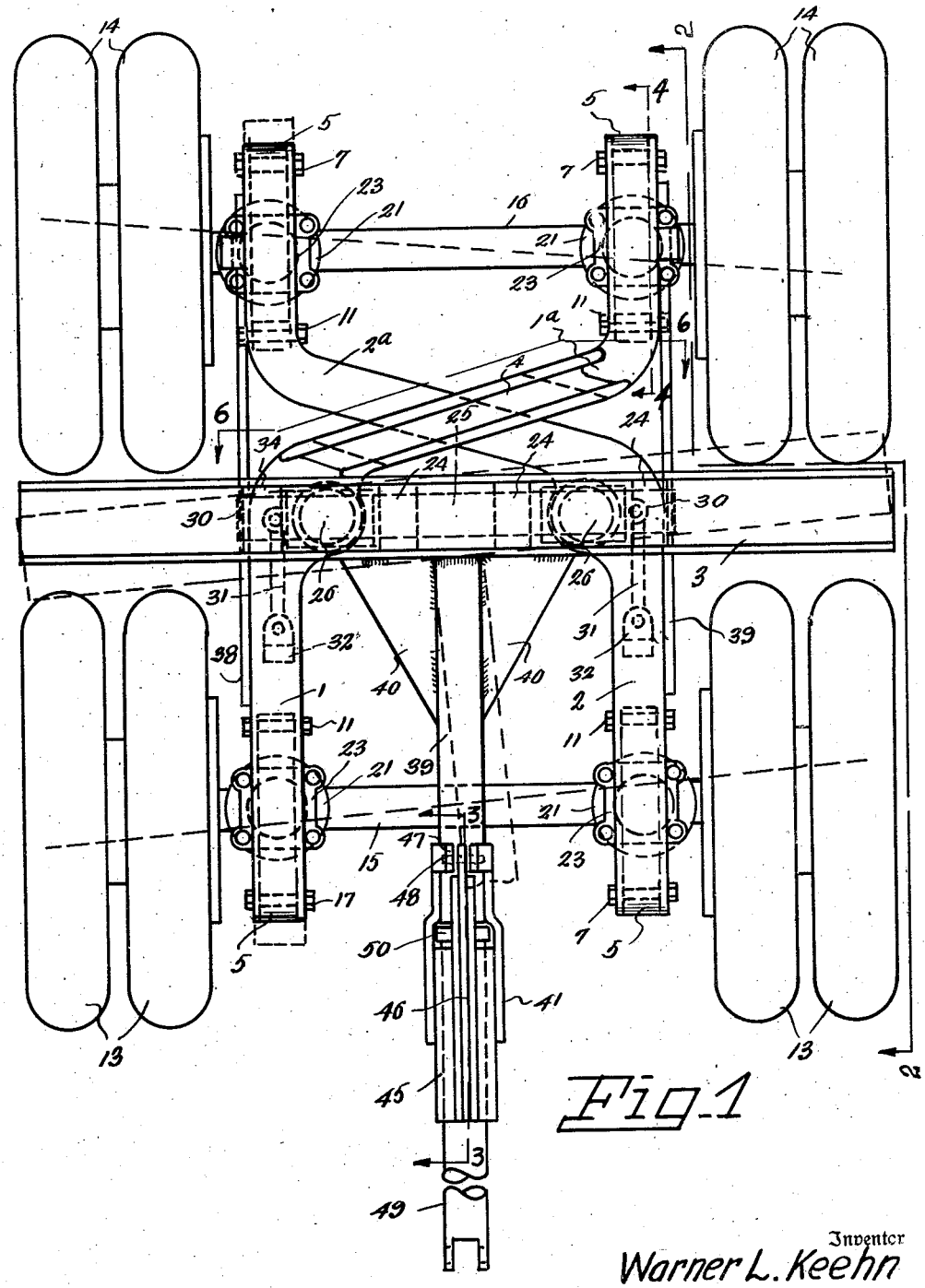
Fig. 1 is a top plan view of the improved trailer.

This improved trailer is particularly adapted for use for hauling logs and has a frame including longitudinally extending side beams 1 and 2, which may be referred to as walking beams, and a cross beam or bunk 3 extending transversely of the trailer over intermediate portions of the side beams. Back of the bunk the side beams have portions 1a and 2a which extend diagonally in crossed relation to each other so that the rear portion of each side beam is at the opposite side of the trailer from the forward portion thereof. The diagonally extending portion of beam 1 is formed with a yoke 4 through which the diagonally extending portion of beam 2 passes. End portions of the side beams are formed with downwardly curved arms 5 terminating in transversely spaced tongues 6 through which a bolt 7 is passed for resting upon the upper leaf 8 of a spring structure 9. In spaced relation to each end, each side beam is formed with transversely spaced ears 10 for carrying a bolt 11 and each spring structure has the inner end of its upper leaf rolled to form a sleeve or hinge ear 12 through which the companion pin or bolt 11 passes to pivotally mount the spring structure and permit the front and rear wheels 13 and 14, carried by the axles 15 and 16, to follow uneven surfaces of a road or move across rocks or other obstructions. The wheels turn freely on the axles and each axle carries saddles 17 spaced from its end and disposed under the companion spring structures 9. A post 18 extends upwardly from each saddle for passing through an opening 19 in the bottom plate 20 of a housing 21 carried by the lower plate 22 of a spring shackle 23. Since the posts 18 are rotatable in the housings 21, pivotal movement is permitted between the axles and the side beams and when the front axle 15 is turned in one direction, the rear axle may turn in an opposite direction, as indicated by dotted lines in Fig. 1, and the front and rear wheels of the trailer so disposed that the trailer will follow a turn made by a main truck to which the trailer is hitched.

The trailer is turned toward one side or the other by swinging the bunk horizontally, as indicated by dotted lines in Fig. 1, and referring to Fig. 5, it will be seen that the bunk carries depending bearings 24 spaced from each other longitudinally of the bunk and through which a shaft 25 is mounted. Posts 26 extend downwardly from the shaft 25 and, at their upper ends, are formed with tubular cross heads 27 through which the shaft passes. The posts 25 pass through openings 28 formed in the side beams 1 and 2 at the junction of the front ends of their diagonally extending portions with rear ends of their forward portions and lower ends of the posts protrude from the side beams and carry collars 29 having ears 30 at their outer sides to which are connected rear ends of torque arms or bars 31 having their front ends connected with ears 32 depending from the side beams. The collars 29 are connected by a strip 33 carrying an upstanding strip 34 which is welded to the strip or plate 33 and has its upper end secured by a bolt 35 to a bracket 36 depending from a plate 37 supported upon upper faces of the side beams and formed with openings registering with the openings 28 through which the posts 26 pass. Flat strips 38 extending longitudinally of the trailer with the forward portions welded to forward portions of the side beams and their rear end portions slidably passing through the rear shackles 23 and serving to prevent the trailer from weaving when a load of logs rocks from side to side while traveling over rough roads.

Movement of the bunk 3 for steering the trailer is controlled by a tongue 39 which projects forwardly from the bunk midway the length thereof and is braced by triangular webs 40 welded to its opposite sides and to the front face of the bunk. This tongue extends forwardly over the front axle and, at its front end, carries a yoke or cradle 41 which is U-shaped in cross section and welded to the tongue with a portion projecting forwardly therefrom. Hinge ears 42 extend downwardly at opposite sides of a slot at the front end of the cradle 41 and carry a pin 43 which passes through the depending ear 44 of a sleeve 45 and pivotally mounts the sleeve for vertical tilting from a horizontal position in which it rests in the cradle, as shown in full lines in Fig. 3, to the inclined position indicated by dotted lines in this figure. A bar or strip 46 is welded to the sleeve and extends longitudinally thereof with its rear portion projecting from the sleeve for engagement between tongues 47 rising from the rear end of the cradle. A pin 48 which is passed through the tongue 47 and the rear end of the bar 46, normally holds the sleeve alined with the tongue so that the draft bar 49 passing through the sleeve will be alined with the tongue and, at its rear end, the draft bar carries a collar 50 which limits its forward movement through the sleeve.

When the trailer is loaded and is being towed behind a logging truck, the tow bar or draft bar remains in alinement with the tongue 39 and the trailer follows the truck. As turns are made, the bunk is swung and the side beams shifted longitudinally in opposite directions so that the front and rear axles will be swung in opposite directions, as indicated by dotted lines in Figure 1 and the trailer caused to follow the truck. After a load has been dumped from the truck and trailer, the pin 48 is removed and the tow bar may tilt vertically to allow the trailer to be shifted forwardly upon its rear wheels 14 until its front wheels 13 rest upon the truck. The sleeve 45 slides forwardly along the tow bar 49 as the trailer is shifted forwardly or rearwardly. Since the rear end of the tongue 39 is rigid with the bunk 3 and the bunk is pivotally connected with the shaft 25 by bearings 24, the tongue and the tow bar may have vertical pivoting movement relative to the frame of the trailer while a loaded trailer is being towed back of a logging truck.

What is claimed is:

1. A trailer comprising side beams each having forward and rear portions at opposite sides of the trailer and a diagonal intermediate portion connecting its end portions, springs carried by ends of said side beams, front and rear axles extending transversely of the side beams under said springs, housings carried by and depending from said springs, trunnions extending upwardly from said axles and rotatably received in the housings, a bunk extending transversely across said beams adjacent rear ends of their forward portions, a shaft under said bunk extending longitudinally thereof and rockably mounted, posts extending downwardly from said shaft and rotatably mounted through openings formed vertically through the side beams, collars carried by lower ends of said posts, a bridge connecting said collars and having an upper portion extending between and resting upon said side beams and formed with openings registering with the post-receiving openings of the side beams, ears extending downwardly from said side beams forwardly of said posts, torque bars connecting said collars with said ears, side strips extending longitudinally of the trailer at opposite sides thereof with their forward ends fixed to forward portions of the side beams and their rear portions slidable longitudinally of the rear portions of the side beams, and means extending forwardly from the bunk for connection with a towing vehicle.

2. A trailer comprising side beams each having forward and rear portions at opposite sides of the trailer and a diagonal intermediate portion connecting its end portions, springs carried by ends of said side beams, front and rear axles extending transversely of the side beams under said springs and pivotally connected with the springs for swinging movement about vertical axes under the springs, a bunk extending transversely across said beams adjacent rear ends of their forward portions, a shaft under said bunk extending longitudinally thereof and rockably mounted, posts extending downwardly from said shaft and rotatably mounted through openings formed vertically through the side beams, and means extending forwardly from said bunk for connection with a towing vehicle.

3. A trailer comprising side beams each having forward and rear portions at opposite sides of the trailer and a diagonal intermediate portion connecting its end portions, springs carried by ends of said side beams, front and rear axles extending transversely of the side beams under said springs and connected therewith for pivotal movement about vertical pivots, a bunk extending transversely of the trailer over the side beams at junctions of forward portions of the beams with their diagonally extending intermediate portions, means mounting the bunk for tilting about an axis extending transversely of the trailer and pivotally connecting the bunk and the side beams for pivotal movement about vertical axes to shift the side beams longitudinally and swing the front and rear axles in opposite directions for steering the trailer, and means extending forwardly from the bunk for connection with a towing vehicle.

4. A trailer comprising side beams each having forward and rear portions at opposite sides of the trailer and a diagonal intermediate portion connecting its end portions, front and rear axles extending transversely of the side beams under end portions thereof and connected therewith for pivotal movement about vertical pivots, a bunk extending transversely of the trailer over the side beams at junctions of the forward portions of the beams with their diagonally extending intermediate portions, bearings extending downwardly from said bunk, a shaft under said bunk extending longitudinally thereof through said bearings and mounting the bunk for rocking movement, posts extending through openings formed through the side beams at the junction of their forward portions with their intermediate portions whereby the bunk may be swung horizontally about vertical axes and the side beams shifted longitudinally for swinging the axles horizontally in opposite directions to steer the trailer, and means carried by and projecting forwardly from said bunk for connection with a towing vehicle.

5. A trailer comprising side beams each having a forward portion and a rear portion at opposite sides of the trailer and an intermediate portion extending diagonally between the front and rear portions, front and rear axles extending transversely under front and rear ends of the side beams and connected therewith for swinging movement horizontally about vertical axes, a bunk extending transversely across the side beams adjacent rear ends of their forward portions, means for supporting said bunk over the side beams engaged with the side beams to permit horizontal swinging of the bunk longitudinally of the trailer and longitudinal shifting of the side beams for swinging the axles in opposite directions to steer the trailer, and means extending forwardly from said bunk for connection with a towing vehicle.

WARNER L. KEEHN.